(12) United States Patent
López Bringué

(10) Patent No.: US 11,183,821 B2
(45) Date of Patent: Nov. 23, 2021

(54) ARTICULATED ARM ASSEMBLY FOR MOTOR VEHICLES

(71) Applicant: Ficomirrors, S.A.U., Barcelona (ES)

(72) Inventor: Lluís Xavier López Bringué, Barcelona (ES)

(73) Assignee: FICOMIRRORS, S.A.U., Barcelona (ES)

( * ) Notice: Subject to any disclaimer, the term of this patent is extended or adjusted under 35 U.S.C. 154(b) by 0 days.

(21) Appl. No.: 16/299,982

(22) Filed: Mar. 12, 2019

(65) Prior Publication Data

US 2019/0280469 A1 Sep. 12, 2019

(30) Foreign Application Priority Data

Mar. 12, 2018 (EP) .................................... 18382160

(51) Int. Cl.
*B60R 1/06* (2006.01)
*B60R 16/02* (2006.01)
(Continued)

(52) U.S. Cl.
CPC ........... *H02G 3/0456* (2013.01); *B60R 1/074* (2013.01); *B60R 11/04* (2013.01); *B60R 16/02* (2013.01);
(Continued)

(58) Field of Classification Search
CPC ....... B60R 1/0612; B60R 1/072; B60R 1/074; B60R 1/06; B60R 1/12; B60R 1/068; B60R 1/07; B60R 11/04; B60R 16/02; B60R 2001/1253; B60R 2011/0085; B60R 2300/101; B60R 1/076; B60R 2011/0082;
(Continued)

(56) References Cited

U.S. PATENT DOCUMENTS 4,027,548 A 6/1977 Cummins
4,084,886 A * 4/1978 Grosch .................. B60R 1/068
359/606
(Continued)

FOREIGN PATENT DOCUMENTS

DE 8716486 U1 1/1988
EP 0644084 A1 9/1994
(Continued)

OTHER PUBLICATIONS

European Search Report for European Application No. 18382160.2; Date of Completion: Jul. 9, 2018; Date of Mailing: Jul. 16, 2018; 6 Pages.

*Primary Examiner* — Roshn K Varghese
(74) *Attorney, Agent, or Firm* — Cantor Colburn LLP

(57) ABSTRACT

An articulated arm assembly for motor vehicles includes first and second arm portions, an electric cable, and a cable carrying structure. The first arm portion is adapted to attach to the motor vehicle. The second arm portion rotates with respect to the first arm portion around an axis of rotation. The electric cable at least partially runs along the first and second arm portions. The cable carrying structure includes at least one first carrying portion associated with the first arm portion and at least one second carrying portion associated (Continued)

with the second arm portion. The first and second carrying portions are adapted such that the electric cable permanently intersects the axis of rotation at an intersection area.

21 Claims, 1 Drawing Sheet

(51) Int. Cl.
*H02G 3/04* (2006.01)
*B60R 1/074* (2006.01)
*B60R 11/04* (2006.01)
*B60R 1/12* (2006.01)
*B60R 11/00* (2006.01)

(52) U.S. Cl.
CPC .............. *H02G 3/0418* (2013.01); *B60R 1/06* (2013.01); *B60R 1/12* (2013.01); *B60R 2001/1253* (2013.01); *B60R 2011/0085* (2013.01); *B60R 2300/101* (2013.01)

(58) Field of Classification Search
CPC ............ B60R 2011/004; H02G 3/0456; H02G 3/0418; H05K 2201/05; H05K 2201/051; H05K 2201/055; H05K 2201/056; F16M 11/14
See application file for complete search history.

(56) References Cited

U.S. PATENT DOCUMENTS

| 6,095,468 | A  | * | 8/2000 | Chirico | F16M 11/2014 248/125.7 |
| 6,523,964 | B2 | * | 2/2003 | Schofield | H04N 5/374 359/601 |
| 6,590,162 | B1 | * | 7/2003 | Luedicke | B60R 16/0215 174/135 |
| 6,793,357 | B2 | * | 9/2004 | Stenzel | B60R 1/0612 359/871 |
| 2008/0185168 | A1 | * | 8/2008 | Matsukawa | H01B 7/0892 174/117 F |
| 2011/0030202 | A1 | * | 2/2011 | Tani | H05K 13/06 29/739 |
| 2012/0078469 | A1 | * | 3/2012 | Karner | B29C 45/0017 701/36 |
| 2014/0345245 | A1 | * | 11/2014 | Borch-Jensen | H02G 1/10 59/78.1 |
| 2015/0222795 | A1 | * | 8/2015 | Sauer | H04N 5/2257 348/148 |

FOREIGN PATENT DOCUMENTS

EP 3136706 A1 8/2016
WO 9104172 A1 4/1991

* cited by examiner

ARTICULATED ARM ASSEMBLY FOR MOTOR VEHICLES

CROSS-REFERENCES TO RELATED APPLICATIONS

This patent application claims priority to European Application No. 18382160.2, filed Mar. 12, 2018, which is incorporated herein by reference in its entirety.

The present disclosure relates to folding structures that find application, for example, in folding mirror and/or camera devices for motor vehicles, where cable routing is involved. Other applications are also possible. The present disclosure refers specifically to an articulated arm assembly for motor vehicles.

BACKGROUND OF THE INVENTION

Folding structures such as for example rear view folding mirror devices inside of which one or more electric cables are provided running there through are known in the art and widely used in the automotive sector. They are structures comprising at least two parts where at least one part can be folded, or rotated, relative to the other and through which an electric cable or a set of cables runs. In one example, the electric cable is electrically connected to an electric device. The folding structures are designed to have an internal configuration for convenient cable routing.

Examples of cable routing in the folding structures where a central aperture is provided through which said cable or set of cables are routed are commonly used such as those disclosed, for example, in EP3136706. Cables are routed inside a routing space that is formed in a bracket and inside an inner supporting tube of a base around which the bracket can rotate.

Also, in document EP0644084 a folding rear view mirror assembly for a motor vehicle is disclosed having a mechanism for turning a mirror housing by means of a motor, and a support for carrying the turning mechanism. A cable leading to the motor is passed through a hollow shaft that is attached to a base that is fixed to the motor vehicle.

The above configurations for cable routing have been found to require high bending radius when the arms are rotated relative to each other. It has been also found in the above configuration that cables may not follow the same paths in all positions during use as a result of which the cable mechanical performance (i.e., structural robustness) is adversely affected.

Alternative solutions to the above cable routing have been provided in which the cable or set of cables are passed through a hole that is formed outside the folding mechanism. For example, in U.S. Pat. No. 4,027,548 a mirror backing plate pivotally mounted to a mirror housing is provided. Cables are associated with a control unit including a remote control knob movable to actuate the mirror backing plate via said cables. The cables are inserted through a base and the mirror housing passing through holes formed in the mirror backing plate.

Solutions based on cable routing through holes formed outside the folding mechanism have been found to involve undesirable forcing movements on cables.

In general, the use of a central passage for cable routing in known foldable structures involves the cable to be bent according to a large bending radius that is required for the purposes of durability and for ensuring proper operation of the cable. In addition, since the cable does not follow the same routing path in all angular positions such as driving unfolding position, safety or front folding position, and parking or back folding position during use, the mechanical performance of the cable is again adversely affected.

SUMMARY OF THE INVENTION

An articulated arm assembly for motor vehicles is disclosed herein. The present articulated arm assembly comprises at least a first arm portion and a second arm portion. The first arm portion is suitable for attaching to a motor vehicle, for example to a vehicle door, although other locations are also possible. The second arm portion is suitable for carrying an electric device, such as for example a folding mirror device or a camera device. Other devices are also possible. The second arm portion in the present articulated arm assembly is capable of rotating with respect to the first arm portion around an axis of rotation.

At least one electric cable is also provided. Any suitable electric cable may be used, associated with the electric device in the second arm portion, such as for example a coaxial cable having an outer diameter ranging from 2.0 to 3.5 mm. The coaxial cable is arranged at least partially running along the first and second arm portions of the arm assembly.

Associated with said least one electric cable and with the first and second arm portions is a cable carrying structure. The cable carrying structure has at least one first carrying portion and at least one second carrying portion. The first carrying portion is associated with the first arm portion. The second carrying portion is associated with the second arm portion. The first and second carrying portions are configured such that that the electric cable is arranged permanently intersecting the axis of rotation at one and the same intersection area. This means that, regardless of the rotational movement of the second arm portion with respect to the first arm portion, the electric cable arranged in the first and second arm portions always intersects the axis of rotation at one intersection area. Said intersection area remains always the same, such that at least one portion of the electric cable in the vicinity of the axis of rotation does not substantially move during use. Within the meaning of the present disclosure, the expression "in the vicinity of" refers to a portion or length of the electric cable that is adjacent, close to or near the axis of rotation and that is defined along the cable carrying structure.

A distance between the first carrying portion and the intersection area and a distance between the second carrying portion and the intersection area may be the same or different.

In a first example, the electric cable may be guided such that it is constrained from moving according to a lateral movement and/or vertical movement. For this purpose, at least one of the first carrying portion and the second carrying portion may define a cable guiding structure. Thus at least one of the first carrying portion and second carrying portion may be configured as guiding portions. The guiding structure is configured for suitably guiding the electric cable so as to allow a longitudinal movement of the electric cable preventing at least one of lateral or vertical movement thereof. In this first example, at least one of the first carrying portion and the second carrying portion may be located at a distance to the intersection area equal to or less than 17 mm.

In a second example, the electric cable may be clamped such that it is constrained from moving according to a longitudinal movement and preferably from moving according to any directions. For this purpose, both the first carrying portion and the second carrying portion define corresponding first and second cable clamping portions for clamping the electric cable against at least a longitudinal movement. In this second example, a distance from at least one of the first and second cable clamping portions and the intersection area may be equal to or less than 65 mm.

The above values of distances from the cable guiding or clamping portions to the intersection area of the axis of rotation are merely examples and may vary depending upon the stiffness of the electric cable, that is, the stiffer the electric cable is, the longer the distance from the cable guiding or clamping portions to the intersection area of the axis of rotation will be.

It should also be pointed out that the cable guiding portions and the cable clamping portions may be combined with each other as long as the electric cable always crosses the axis of rotation through one and the same intersection area.

As used herein, a lateral movement refers to a movement of the electric cable on a plane that is at least substantially perpendicular to axis of rotation defined by rotation of the second arm portion with respect to the first arm portion.

As also used herein, a vertical movement refers to a movement of the electric cable in a direction corresponding or at least substantially parallel to the axis of rotation.

Finally, as used herein, a longitudinal movement refers to a movement of the electric cable in a direction at least substantially parallel to a longitudinal dimension of the first and second arm portions.

In some cases, it may be preferred that a cable section of the electric cable between the first clamping portion and the second carrying portion is tensioned such that an increased stiffness is achieved. This may further ensure that the electric cable does not move during use at least in areas in the vicinity of the axis of rotation. Said cable section between the first and second carrying portions may lie on a first plane that is substantially perpendicular to the above mentioned axis of rotation that is defined by rotation of the second arm portion with respect to the first arm portion.

Whether the articulated arm assembly is configured through a guiding structure or through clamping portions, the electric cable always remains conveniently routed, and tensioned if required, in any operation modes of the arm assembly regardless the relative angular position of any of the arm portions during use, e.g. driving unfolding position, safety or front folding position, parking or back folding position, etc.

One important advantage of the present articulated arm assembly in which the electric cable is arranged permanently intersecting the axis of rotation at one and the same intersection area is that a cable bending radius is advantageously minimized. The electric cable is appropriately routed passing along the arm portions without the cable being forced during use in any of the above mentioned folding positions. As a result, a minimum bending radius of the cable is reduced since the bending radius is static, that is, it does not change in operation, i.e. as the arm portions are rotated relative to each other. In some prior art articulated arm assemblies, instead, a larger cable bending radius is required as it is variable, that is, the bending radius is dynamic since its value is varied in operation, resulting in that it is of the order of ten times the diameter of the cable. Instead, the minimum bending radius in the present articulated arm assembly may advantageously be of the order of three times the diameter of the cable.

At the same time, the overall size of the articulated arm assembly can be reduced as compared to typical articulated arm structures since a transversal passage in both the first arm portion and the second arm portion for the axial cable to pass through is not required. This results in an improved appearance and styling while mechanical resistance is increased and damage to the cable is reduced.

The present arm assembly may further include a cover for covering at least part of the first arm portion and the second arm portion. If provided, said cover may further include at least one of the first carrying portion and the second carrying portion. In one example, the cover may include a cable guiding structure for guiding the electric cable so as to allow a longitudinal movement of the electric cable and to prevent at least a lateral or vertical movement thereof as described above. In a further example, the cover may include at least one of the first carrying portion and second carrying portion defining corresponding first and second cable clamping portions for clamping the electric cable against a longitudinal movement as described above.

In one practical example of the present articulated arm assembly for motor vehicles, the above mentioned electric cable has a first cable length, a second cable length and a third cable length. The third cable length is a transitional cable length between said first and second cable lengths. The first cable length is arranged running at least partially along the first arm portion lying on a first plane. The second cable length is arranged running at least partially along the second arm portion lying on a second plane. Said first and second planes on which the first and second cable lengths are disposed are spaced apart from each other. The third, transitional cable length is defined between said first and second cable lengths as stated above. Corresponding bending sections are defined between the third cable length and said first and second cable lengths having corresponding radiuses. Said bending radiuses are for example at least three times an outer diameter of the electric cable.

As used herein, a length is intended to refer to a portion or a section of a length of the cable.

As a result of the above described configuration of the present articulated arm assembly for motor vehicles, cable stretching and contraction caused as the articulated arm assembly is driven are advantageously prevented. No additional cable length is thus required to accommodate cable stretching and contraction effects during use. Since no additional cable length is required, problematic movements are avoided since cable bending radius is reduced.

BRIEF DESCRIPTION OF THE DRAWINGS

A non-limiting example of the present articulated arm assembly for motor vehicles will be described in the following, with reference to the appended drawings, in which.

DETAILED DESCRIPTION

Figure 1:
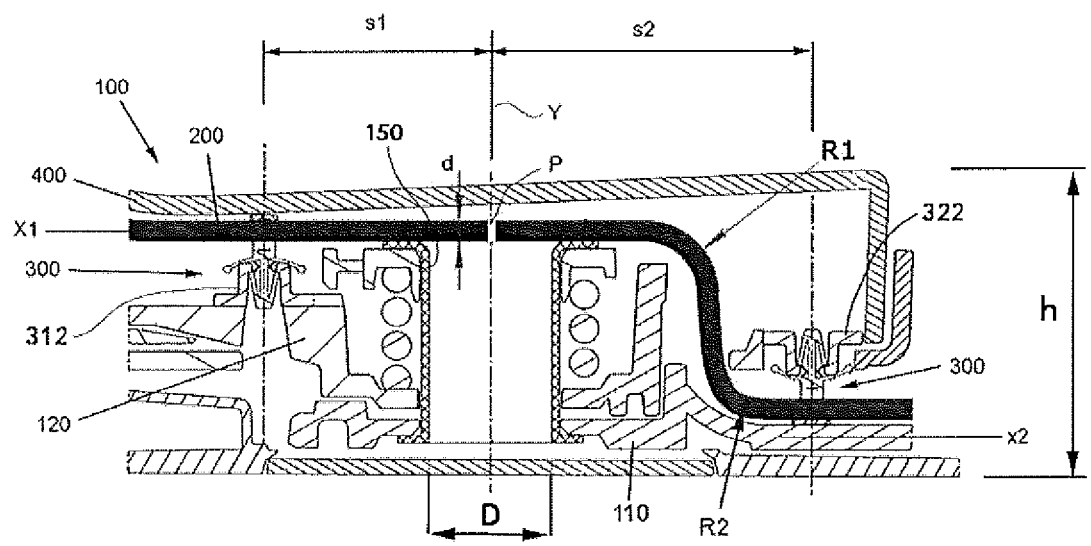
FIG. 1 is a fragmentary elevational sectional view along line AA of FIG. 2 of one example of an articulated arm assembly for motor vehicles.

The figures show a non-limiting example of the articulated arm assembly 100 that is intended for carrying a camera for a rear-view mirror system in a motor vehicle. Other applications are of course not ruled out.

In the specific example shown in the figures, the articulated arm assembly 100 comprises a first arm portion 110. The first arm portion 110 of the articulated arm assembly 100 is intended to be attached to a vehicle door, not shown. The articulated arm assembly 100 further comprises a second arm portion 120. The second arm portion 120 of the articulated arm assembly 100 is intended to carry an electric device (e.g., a rear-view camera) in the rear-view mirror system, not shown. The second arm portion 120 is configured such that it can be rotated with respect to the first arm portion 110 around an axis of rotation Y. The axis of rotation Y is defined in a hollow shaft 150 having an inner diameter D.

With the above configuration, the rear-view camera in the second arm portion 120 can be arranged at a number of relative angular positions to the first arm portion 110 during use, such as driving unfolding position, safety or front folding position, and parking or back folding position.

Associated with the electric device is an electric cable 200. In the example of the electric device being a rear-view camera, the electric cable may be a coaxial cable 200. The coaxial cable 200 in this example is a multi-core, shielded symmetrical coaxial cable with foam or solid dielectric having an outer diameter d (FIG. 2) ranging from 2.0 to 3.5 mm. The cable 200 is arranged at least partially running along the first and second arm portions 110, 120 of the arm assembly 100, as shown in the figures.

Figure 2:
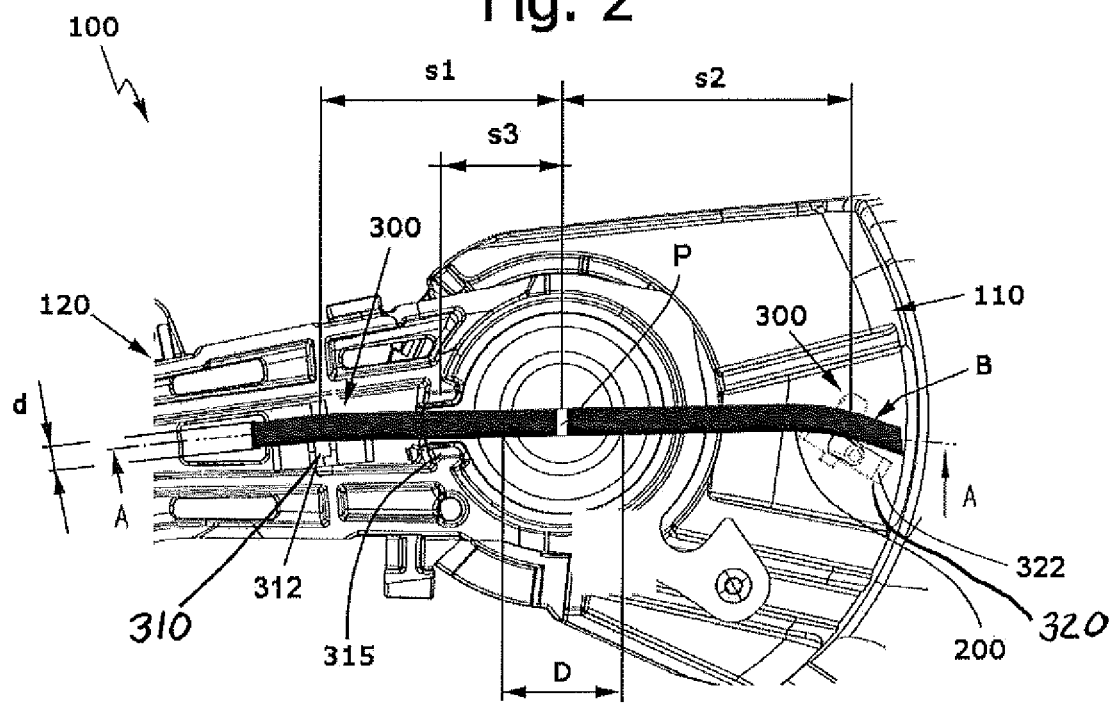
FIG. 2 is a top plan view of the example of the articulated arm assembly in FIG. 1.

A bending radius B is defined in a plane where the electric cable 200 moves during use, with said plane being at least substantially perpendicular to the axis of rotation Y. For the purpose of minimizing a bending radius B of the electric cable 200 during use, as shown in FIG. 2, a particular configuration in the articulated arm assembly 100 is provided. Specifically, a cable carrying structure 300 is provided associated with both the electric cable 200 and the first and second arm portions 110, 120. The cable carrying structure 300 comprises at least one first carrying portion 310 that is associated with the first arm portion 110 and a second carrying portion 320 that is associated with the second arm portion 120.

Two different cases of cable carrying structure 300 are possible. In both cases, the first and second carrying portions 310, 320 are configured such that that the electric cable 200 is arranged permanently intersecting the axis of rotation Y at one and the same intersection area P as it will be explained further below.

In a first case, the cable carrying structure 300 comprises a cable guiding portion 315 as shown in FIG. 2. The cable guiding portion 315 is configured in a way that a longitudinal movement of the electric cable 200 along the first and second arm portions 110, 120 is only allowed. The electric cable 200 is thus conveniently guided along the first arm portion 110 and the second arm portion 120 such that it is constrained from moving according to a lateral movement and/or vertical movement relative to the first and second arm portions 110, 120. The cable guiding portion 315 in the example of FIG. 2 is located at a distance s3 to the intersection area P that is equal or less than 17 mm. Dimensions in the drawings are not to scale.

In a second case, the cable carrying structure 300 comprises cable clamping portions 312, 322, as shown in FIGS. 1 and 2. Thus, FIG. 1 corresponds to one example where the cable carrying structure 300 comprises two cable clamping portions 312, 322, and FIG. 2 corresponds to a further example where the cable carrying structure 300 comprises two cable clamping portions 312, 322, and also a cable guiding portion 315.

The cable clamping portions 312, 322 are configured in a way that the electric cable 200 is clamped or attached against a longitudinal movement relative to the first and second arm portions 110, 120. The electric cable 200 is thus constrained from moving to any directions. Distances s1, s2 from the first and second cable clamping portions to the intersection area P are equal to or less than 65 mm. A section or length of the electric cable 200 between the first and second carrying portions 310, 320 is tensioned to increase cable stiffness. The cable tensioned length is arranged on a first plane X1 that is substantially perpendicular to the axis of rotation Y.

The meaning of the following concepts used herein to define movement directions is as follows:
lateral movement refers herein to a movement direction of the electric cable 200 on a plane that is at least substantially perpendicular to the axis of rotation Y;
vertical movement refers herein to a movement direction of the electric cable 200 in a direction corresponding or at least substantially parallel to the axis of rotation Y; and
longitudinal movement refers to a movement of the electric cable 200 in a direction at least substantially parallel to a longitudinal dimension of the first and second arm portions 110, 120.

In any of the above examples, regardless of the rotational movement of the second arm portion 120 with respect to the first arm portion 110, the electric cable 200 that runs therealong always intersects the axis of rotation Y at one intersection area P with said intersection area P being always the same, that is, in the same position during use. Since the intersection area P remains always the same, at least one section or length of the electric cable 200 in the vicinity of the axis of rotation Y does not substantially move during use. The expression: "in the vicinity of" refers herein to a portion or length of the electric cable 200 near the axis of rotation Y extending along the cable carrying structure 300, between the cable clamping portions 312, 322.

Referring again to FIG. 1, a cover 400 is also provided. The cover 400 is arranged on top of the first arm portion 110 and the second arm portion 120. The cover 400 is configured to at least partially cover the first arm portion 110 and the second arm portion 120 while including the first carrying portion 310 and the second carrying portion 320.

Continuing to FIG. 1, a first cable length or portion is defined in the electric cable 200 running at least partially along the first arm portion 110. The first length of the electric cable 200 is arranged lying on the above mentioned first plane X1. A second cable length or portion is also defined in the electric cable 200 running at least partially along the second arm portion 120. The second length of the electric cable 200 is arranged lying on the above mentioned a second plane X2 that is located spaced apart from the first plane X1. A third, transitional cable length is also defined between said first and second cable lengths. Between the third cable length and the first and second cable lengths corresponding bending sections are defined having corresponding radiuses R1, R2 as illustrated in FIG. 1 amounting at least three times an outer diameter d of the coaxial cable.

With the configuration of the articulated arm assembly 100 described above, the electric cable 200 is always conveniently routed regardless the relative angular position of the arm portions 110, 120 during use, e.g. driving unfolding position, safety or front folding position, parking or back folding position, etc. Such convenient routing results in the overall size of the articulated arm assembly 100 to be advantageously reduced. This is because the inner diameter D of the hollow shaft 150 may be reduced since the electric cable 200 is not required to pass through said hollow shaft 150 as in the prior art articulated arm assemblies. As a result, the overall height h of the articulated arm assembly 100 can be reduced.

At least for packaging advantages of the articulated arm assembly 100, it may be desirable to minimize the cable bending radius B. That is, the bending radius of the present disclosure is substantially less than the bending radius of more traditional articulated arm assemblies. Traditionally and in some prior art examples, a bending radius of a cable in an articulated arm assembly is maintained relatively high because the associated cable bend is in motion (i.e., flexes) when the assembly is articulated. This motion may produce cable fatigue and/or failure over time if the bend is too acute. In contrast, the cable bends of the present disclosure are static (i.e., not in motion). This lack of motion permits greater versatility in cable 200 routing and tighter bends having smaller bend radii B.

Yet further and in some prior art examples, the electric cable is routed vertically through a hollow shaft (i.e., similar in purpose to the shaft 150 of the present disclosure) requiring cable bends proximate to the inlet and outlet ends of the hollow shaft. In the present disclosure, the cable 200 may not be routed through the hollow shaft 150. In this example of the articulated arm assembly 100, static cable bend(s) are independent from, and spaced away from, the hollow shaft 150. This disassociation of the cable 200 from the hollow shaft 150 facilitates greater flexibility in design, and enables a reduction in the height (i.e., or a distance coextending with the axis of rotation Y) of the articulated arm assembly 100 when compared to prior art designs.

An advantageous decrease in the cable bending radius B is achieved as compared to prior art articulated arm assemblies where the electric cable 200 is bent at least twice as it passes through the hollow shaft 150 resulting in two large bending radiuses being defined, which in the majority of cases are different to each other. In the present articulated arm assembly 100, the cable bending radius B is minimized since the electric cable 200 is not passed through the hollow shaft 150 and is instead arranged always intersecting the axis of rotation Y at the same intersection area P regardless the operating position of the arm portions 110, 120. The electric cable 200 can be thus arranged running along the articulated arm assembly 100 without the cable 200 being forced when in any of said driving unfolding position, safety or front folding position, parking or back folding positions.

Although only a number of examples of the present articulated arm assembly for motor vehicles have been disclosed herein, other alternatives, modifications, uses and/or equivalents thereof are possible.

Furthermore, all possible combinations of the described examples are also covered. Thus, the scope of the present disclosure should not be limited by particular examples, but should be determined only by a fair reading of the claims that follow. If reference signs related to drawings are placed in parentheses in a claim, they are solely for attempting to increase the intelligibility of the claim, and shall not be construed as limiting the scope of the claim.

The invention claimed is:

1. An articulated arm assembly comprising:
   a shaft axially extending along an axis of rotation;
   a first arm portion engaged to and projecting radially outward from the shaft, wherein the first arm portion is an arm;
   a second arm portion engaged to and projecting radially outward from the shaft, wherein the second arm portion is adapted to rotate with respect to the first arm portion around the axis of rotation;
   an electric cable at least partially running along the first and second arm portions and the electric cable being completely outside of the shaft; and
   a cable carrying structure having at least one first carrying portion directly attached to the first arm portion and at least one second carrying portion directly attached to the second arm portion, the first and second carrying portions adapted such that the electric cable permanently intersects the axis of rotation at an intersection area, wherein one of the first and second arm portions are rotationally engaged to the shaft and the other of the first and second arm portions is rigidly engaged to the shaft, wherein respective longitudinal portions of respective first and second cable lengths of the electric cable are disposed completely in the respective first and second carrying portions and are perpendicular to the axis of rotation.

2. The articulated arm assembly of claim 1, wherein a distance measured from and directly between the first carrying portion and the intersection area, and a distance measured from and directly between the second carrying portion and the intersection area are the same.

3. The articulated arm assembly of claim 1, wherein a distance (sl) between the first carrying portion and the intersection area and a distance between the second carrying portion and the intersection area are different.

4. The articulated arm assembly of claim 3, wherein at least one of the first carrying portion and second carrying portion defines a cable guiding structure adapted to guide the electric cable so as to allow a longitudinal movement of the electric cable and to prevent at least one of lateral and vertical movement of the electric cable.

5. The articulated arm assembly of claim 1, wherein the first carrying portion is a first cable clamping portion and the second carrying portion is a second cable clamping portion, and the cable carrying structure further includes a cable guiding structure that guides the electric cable so as to permit longitudinal movement of the electric cable and to prevent at least one of lateral and vertical movement of the electric cable.

6. The articulated arm assembly of claim 5, wherein the at least one of the first carrying portion and second carrying portion is at a distance to the intersection area equal to or less than 17 mm.

7. The articulated arm assembly of claim 6, further comprising:
   a cover adapted to cover at least part of the first arm portion and the second arm portion.

8. The articulated arm assembly of claim 1, wherein the first carrying portion and the second carrying portion include respective first and second cable clamping portions adapted to clamp the electric cable preventing longitudinal movement of the electric cable.

9. The articulated arm assembly of claim 8, wherein a distance from at least one of the first and second cable clamping portions and the intersection area is equal to or less than 65 mm.

10. The articulated arm assembly of claim 8, wherein a cable section of the electric cable located between the first carrying portion and the second carrying portion is in tension.

11. The articulated arm assembly of claim 10, wherein the cable section located between the first and second carrying portions lies on a first plane that is substantially perpendicular to the axis of rotation.

12. The articulated arm assembly of claim 1, further comprising:
    a cover covering at least part of the first arm portion and the second arm portion.

13. The articulated arm assembly of claim 12, wherein the cover further covers at least one of the first carrying portion and second carrying portion, and wherein the cable carrying structure is a cable guiding structure for guiding the electric cable to allow for longitudinal movement of the electric cable and to prevent at least one of lateral movement and vertical movement of the electric cable.

14. The articulated arm assembly of claim 12, wherein the cover further covers at least one of the first carrying portion and the second carrying portion, and wherein the first and second carrying portions are respective first and second cable clamping portions adapted to clamp the electric cable against longitudinal movement.

15. The articulated arm assembly of claim 14, wherein the electric cable has a first cable length running at least partially along the first arm portion and lying on a first plane, and a second cable length running at least partially along the second arm portion and lying on a second plane, the first and second planes being spaced apart from each other such that a third, transitional cable length is defined between the first and second cable lengths, and wherein corresponding bending sections of the electric cable are defined between the third cable length and the first and second cable lengths.

16. The articulated arm assembly of claim 1, wherein the electric cable is a coaxial cable.

17. An articulated arm assembly comprising:
a shaft axially extending along an axis of rotation;
a first arm portion engaged to and projecting radially outward from the shaft;
a second arm portion engaged to and projecting radially outward from the shaft, wherein the second arm portion is adapted to rotate with respect to the first arm portion around the axis of rotation;
an electric cable at least partially running along the first and second arm portions and the electric cable being completely outside of the shaft; and
a cable carrying structure having at least one first carrying portion directly attached to the first arm portion and at least one second carrying portion directly attached to the second arm portion, the first and second carrying portions adapted such that the electric cable permanently intersects the axis of rotation at an intersection area, wherein one of the first and second arm portions are rotationally engaged to the shaft and the other of the first and second arm portions is rigidly engaged to the shaft, wherein the electric cable has a first cable length running at least partially along the first arm portion and lying on a first plane, and a second cable length running at least partially along the second arm portion and lying on a second plane, the first and second planes being spaced apart from each other such that a third, transitional cable length is defined between the first and second cable lengths, and wherein corresponding bending sections of the electric cable are defined between the third cable length and the first and second cable lengths, and wherein the first and second planes are parallel to one-another.

18. The articulated arm assembly of claim 17, wherein the corresponding bend sections have corresponding radiuses being at least three times an outer diameter of the electric cable.

19. The articulated arm assembly of claim 18, wherein an outer diameter (d) of the electric cable is 2.0-3.5 mm.

20. The articulated arm assembly of claim 19, wherein the electric cable is a coaxial cable.

21. An articulated arm assembly comprising:
a shaft axially extending along an axis of rotation;
a first arm portion engaged to and projecting radially and longitudinally outward from the shaft, wherein the first arm portion is a first arm;
a second arm portion engaged to and projecting radially outward from the shaft, wherein the second arm portion is adapted to rotate with respect to the first arm portion around the axis of rotation;
an electric cable at least partially running along the first and second arm portions and the electric cable being completely outside of the shaft; and
a cable carrying structure having a first clamping portion directly attached to the first arm portion and a second clamping portion directly attached to the second arm portion, wherein at least one of the first and second clamping portions are adapted such that the electric cable permanently intersects the axis of rotation at an intersection area, wherein one of the first and second arm portions are rotationally engaged to the shaft and the other of the first and second arm portions is rigidly engaged to the shaft, and wherein the first and second clamping portions are adapted to clamp the electrical cable preventing longitudinal movement of the electrical cable.

* * * * *